United States Patent
Mills

(10) Patent No.: US 10,352,149 B2
(45) Date of Patent: Jul. 16, 2019

(54) METHODS AND APPARATUS TO DETERMINE PRODUCTION OF DOWNHOLE PUMPS

(71) Applicant: Bristol, Inc., Watertown, CT (US)

(72) Inventor: Thomas Matthew Mills, Katy, TX (US)

(73) Assignee: Bristol, Inc., Houston, TX (US)

( * ) Notice: Subject to any disclaimer, the term of this patent is extended or adjusted under 35 U.S.C. 154(b) by 708 days.

(21) Appl. No.: 14/753,335

(22) Filed: Jun. 29, 2015

(65) Prior Publication Data

US 2015/0300156 A1 Oct. 22, 2015

Related U.S. Application Data

(63) Continuation-in-part of application No. 14/225,105, filed on Mar. 25, 2014, now abandoned.

(51) Int. Cl.
| | |
|---|---|
| *E21B 43/12* | (2006.01) |
| *E21B 47/00* | (2012.01) |
| *F04B 47/02* | (2006.01) |
| *F04B 49/06* | (2006.01) |
| *G01M 3/26* | (2006.01) |

(52) U.S. Cl.
CPC ........ *E21B 47/0007* (2013.01); *E21B 43/127* (2013.01); *E21B 47/0008* (2013.01); *F04B 47/02* (2013.01); *F04B 47/022* (2013.01); *F04B 49/065* (2013.01); *G01M 3/26* (2013.01)

(58) Field of Classification Search
CPC .......................... E21B 47/0007; E21B 43/127
USPC ......................................................... 702/51
See application file for complete search history.

(56) References Cited

U.S. PATENT DOCUMENTS

| | | | |
|---|---|---|---|
| 2,540,049 A | 1/1951 | Hinson | |
| 2,964,941 A | 12/1960 | Marsh et al. | |
| 4,727,489 A | 2/1988 | Frazier et al. | |
| 5,252,031 A | 10/1993 | Gibbs | |
| 5,823,262 A | 10/1998 | Dutton | |
| 5,996,690 A * | 12/1999 | Shaw ...................... | B04C 11/00 166/250.01 |
| 7,212,923 B2 | 5/2007 | Gibbs et al. | |
| 7,474,969 B2 | 1/2009 | Poulisse | |

(Continued)

OTHER PUBLICATIONS

Richard Kyle Chambliss. "Plunger Leakage and Viscous Drag for Beam Pump Systems." Texas Tech University. 2001, 83 pages.

(Continued)

*Primary Examiner* — Igwe U Anya
(74) *Attorney, Agent, or Firm* — Hanley, Flight & Zimmerman, LLC

(57) ABSTRACT

Methods and apparatus to determine production of a downhole pump are described herein. An example method includes measuring a first amount of liquid produced from a well by a pump during a first stroke of the pump, computing a first pump card based on the first stroke, determining a first area of the first pump card and determining a leakage proportionality constant of the pump based on the first amount of liquid produced and the first area. The example method also includes computing a second pump card based on a second stroke of the pump, determining a second area of the second pump card and determining a second amount of liquid produced by the pump during the second stroke based on the leakage proportionality constant and the second area.

19 Claims, 10 Drawing Sheets

(56) References Cited

U.S. PATENT DOCUMENTS

| | | | |
|---|---|---|---|
| 8,849,594 B2 | 9/2014 | Mills | |
| 2005/0045332 A1* | 3/2005 | Howard | E21B 43/126 166/302 |
| 2006/0149476 A1* | 7/2006 | Gibbs | E21B 47/0008 702/6 |
| 2007/0020110 A1* | 1/2007 | Mills | E21B 47/0008 417/53 |
| 2007/0295501 A1* | 12/2007 | Poulisse | E21B 47/10 166/250.01 |
| 2008/0087332 A1* | 4/2008 | Noble | F04C 2/1071 137/538 |
| 2008/0095643 A1* | 4/2008 | Noble | F04C 2/1073 417/212 |
| 2009/0055029 A1* | 2/2009 | Roberson | E21B 47/00 700/282 |
| 2013/0024138 A1* | 1/2013 | Mills | E21B 47/0008 702/47 |
| 2015/0142319 A1* | 5/2015 | McCoy | E21B 47/0007 702/9 |
| 2015/0260033 A1* | 9/2015 | Mills | E21B 47/0007 702/94 |
| 2015/0275650 A1 | 10/2015 | Mills | |

OTHER PUBLICATIONS

Nolen et al., "Quantitative Determination of Rod-Pump Leakage With Dynamometer Techniques," SPE Production Engineering, Society of Petroleum Engineers, pp. 225-230, 1990, 6 pages.

United States Patent and Trademark Office, "Notice of Allowance," issued in connection with U.S. Appl. No. 13/187,330, dated Aug. 8, 2014, 33 pages.

United States Patent and Trademark Office, "Ex-Parle Quayle Action," issued in connection with U.S. Appl. No. 13/187,330, mailed on May 12, 2014, 18 pages.

Patent Cooperation Treaty, "International Search Report and Written Opinon," issued in connection with PCT Application No. PCT/US2015/023763, dated Aug. 24, 2015, 10 pages.

Office Action, issued by the United States Patent and Trademark Office in connection with U.S. Appl. No. 14/225,105, dated Apr. 7, 2016, 8 pages.

* cited by examiner

METHODS AND APPARATUS TO DETERMINE PRODUCTION OF DOWNHOLE PUMPS

RELATED APPLICATION

This patent is a continuation-in-part of U.S. patent application Ser. No. 14/225,105, filed Mar. 25, 2014, which is hereby incorporated by reference in its entirety.

FIELD OF THE DISCLOSURE

This disclosure relates generally to downhole pumps and, more particularly, to methods and apparatus to determine production of downhole pumps.

BACKGROUND

Downhole pumps are used to pump fluid from a formation by moving a piston relative to a bore. Clearance is provided between the piston and the bore to ensure that downhole debris does not negatively affect the performance of the downhole pump. However, this clearance allows for leakage between the piston and the bore. Further, in some instances the pump may not be completely full when pumping. As a result, pump fillage affects the amount of fluid produced by a pump.

Figure 1:
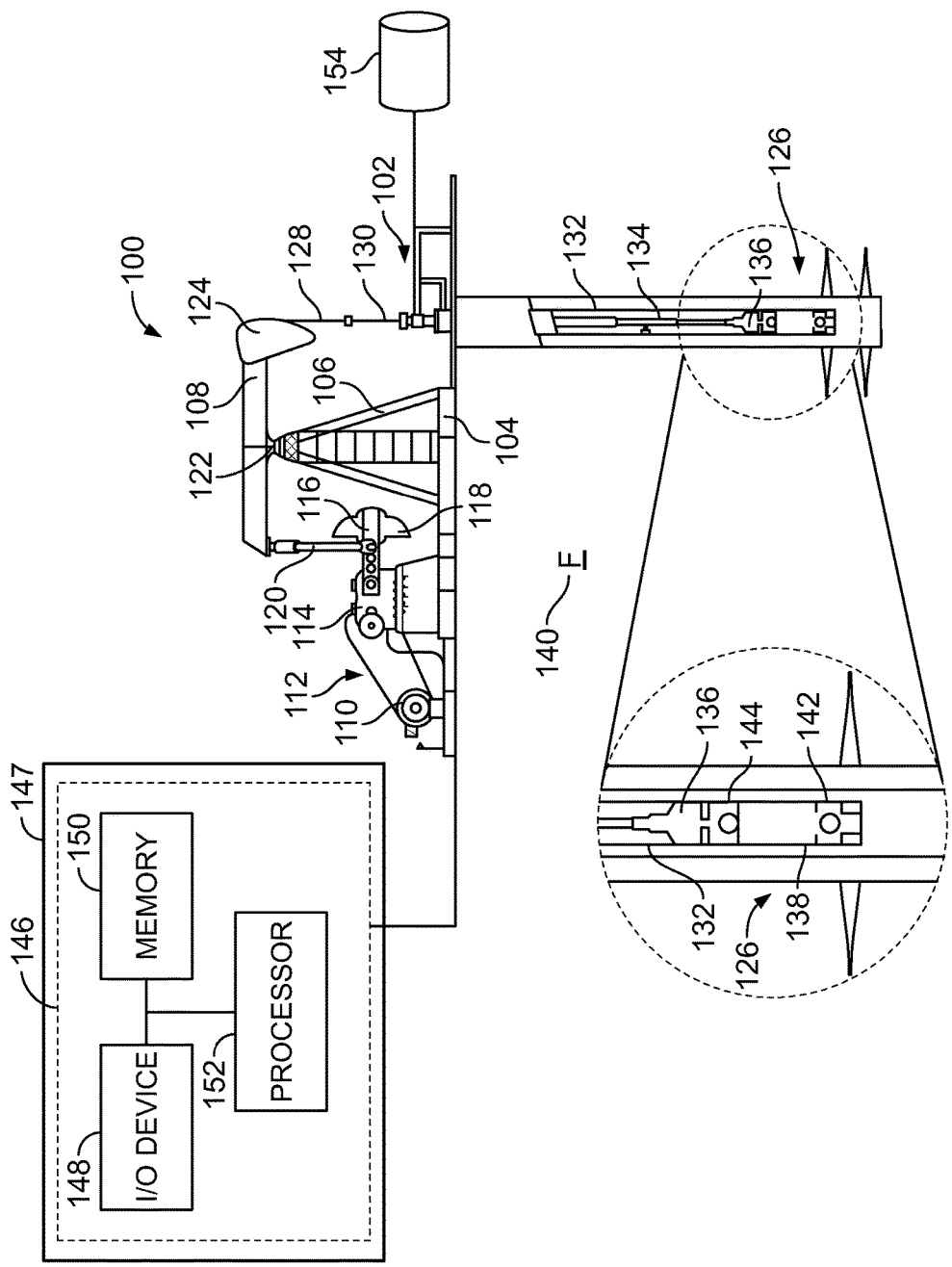
FIG. 1 shows a pumping unit including an example apparatus used to determine the production of a well in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

An oilfield downhole reciprocating pump (e.g., a rod pump) is often considered to be a positive displacement pump because a plunger or piston of a known diameter travels a known (or calculable) distance with each stroke. It is desired to use a pump as a meter to approximate the daily production from a well by relating the number of pump strokes during the day and the pump geometry to an inferred production quantity. In other words, because the displacement volume of the pump is known (or calculable), it is desired to use the number of strokes during a time period to infer a volume of liquid produced. However, downhole oil pumps do not perform as true positive displacement pumps because the pumps are typically designed with significant clearance between the piston and a barrel through which the piston reciprocates, resulting in leakage or slip.

In accordance with the teachings of this disclosure, information associated with a downhole reciprocating pump may be used to approximate production from a corresponding well. In general, production can be estimated based on the area of a pump and the distance of the pump stroke, which equates to an estimated displacement volume for each stroke. However, known production estimates do not take into account other factors that may affect the volume produced such as, for example, pump fillage and/or pump leakage. The example methods and apparatus disclosed herein may be used to more accurately estimate production by taking into account at least these two variables.

Pump fillage refers to the amount of fluid in a barrel of the pump (e.g., between the piston and a bottom of the barrel). If the barrel of the pump is not completely full when the piston moves downward during the downstroke, then the volume of the liquid pumped by the piston in the upstroke is not the same as the displacement volume of the pump. The methods and apparatus disclosed herein may be used to determine a pump fillage factor (e.g., a fraction), which is useful for a number of rod pump control applications. For example, a pump fillage factor is a highly desirable process variable for rod pump speed control and/or rod pump on/off control. In variable speed rod pumping applications, the pump speed may be decreased when pump fillage factor is below a target value (e.g., a set point, a threshold) and increased when pump fillage factor is above the target value. For on/off control applications, the pump fillage factor can be monitored and when the pump fillage factor falls below a target value for a specified number of strokes, the pump can be stopped and the well can be left in idle to allow the well casing to be filled by the producing formation. Therefore, when pumping is resumed (at the end of idle time), sufficient fluid may be present to fill the pump. These strategies may be employed to reduce energy consumption per unit of liquid produced and reduce wear on pump system components, thereby lengthening the life of a pumping system.

Additionally, downhole pumps are designed with a clearance or gap between the piston and the barrel or tube within which the piston reciprocates. Therefore, on the upstroke (e.g., when a pressure difference across the piston exists), leakage occurs between the pump and the barrel. As a result, the volume of fluid actually pumped is less than the predicted or estimated volume. The example methods and apparatus disclosed herein may be used to determine a leakage proportionally constant that may be used to more accurately predict the volume of oil produce in each stroke. In some examples, the pump fillage fraction or factor is also used to determine the leakage proportionally constant. Therefore, the example methods and apparatus disclosed herein may be used to determine pump fillage and leakage, which can then be used to more accurately infer production. Specifically, production from the well may be inferred based on the number of strokes of the pumping unit, the geometry of the downhole pump, the example leakage proportionality constant and/or the pump fillage factor. A stroke refers to a complete cycle including an upstroke and a down stroke.

Also, in most applications of a reciprocating rod pump, an operator or owner may desire to operate the well at or near "pumpoff," which is the point at which the available liquid in the wellbore is marginally adequate to fill the pump. In general, operating a well near pumpoff results in the lowest practical producing bottom hole pressure. Also, inflow to the wellbore increases as bottom hole pressure declines. Therefore, operating the well at or near pumpoff generally results in maximum production from the well. However, in some instances, an operator may desire to operate a well at a specified wellbore pressure other than at pumpoff. This strategy may provide superior reservoir management because it enables lighter hydrocarbon components to remain in solution with the liquid phase as the products flow toward the wellbore. By maintaining the product in a liquid only phase, the effective permeability to liquids is increased. In some instances, this approach results in higher overall recovery of hydrocarbons (although in some instances the recovery may take a longer period of time). To operate a well at (or around) a specified downhole pressure value (e.g., a set point, a threshold), some method of measuring or estimating wellbore (pump intake) pressure is needed. Some instrumentation products are available to directly measure these values. However, these products are generally expensive and operationally complex to install. The example methods and apparatus disclosed herein provide a technique for determining the pressure difference across the pump using the pump fillage factor described above. As a result, the intake pressure of the pump can be determined and used to control the speed of the pump. The intake pressure of the pump may be used for rod pump speed control and rod pump on/off control. In other words, the pump speed may be decreased or increased and/or the pump may be stopped or started based on the intake pressure of the pump.

FIG. 1 shows an example pumping unit 100 that may be used to produce oil from an oil well 102. The pumping unit 100 includes a base 104, a Sampson post 106 and a walking beam 108. In the illustrated example, the pumping unit 100 includes a motor or engine 110 that drives a belt and sheave system 112 to rotate a gear box 114 and, in turn, rotate a crank arm 116 and a counterweight 118. A pitman 120 is coupled between the crank arm 116 and the walking beam 108 such that rotation of the crank arm 116 moves the pitman 120 and the walking beam 108. As the walking beam 108 pivots about a pivot point and/or saddle bearing 122, the walking beam 108 moves a horse head 124 to provide reciprocating movement to a downhole pump 126 via a bridle 128, a polished rod 130, a tubing string 132 and a rod string 134.

In the illustrated example, the reciprocating movement of the horse head 124 moves a piston 136 of the pump 126 within a barrel 138 (e.g., a bore, a casing, a housing, etc.) of the pump 126 to draw liquid from the surrounding formation 140 (labeled as F). During an upstroke of the piston 136, liquid is drawn into the bore 138 through a stationary valve 142 (e.g., a lower valve) located at a bottom of the bore 138. The piston 136 includes a traveling valve 144 (e.g., an upper valve) that is in the closed position. As such, the piston 126 pushes the fluid in the tubing 132 above the piston 136 to the surface. During a downstroke, the traveling valve 144 of the piston 126 opens, which enables the fluid in the barrel 138 to flow through the valve 144 and into the tubing 138 above the piston 126. During this time the stationary valve 142 is closed. The piston 126 then moves upward during a subsequent upstroke to push the fluid in the tubing 132 toward the surface, and so forth.

To ensure that debris does not negatively impact production and/or negatively impact movement of the piston 136 relative to the bore 138, a clearance or gap is provided between the piston 136 and the bore 138. The clearance reduces the volume of fluid produced by the pump 126 during each stroke of the pumping unit 100.

To accurately determine the production from the pump 126, the pumping unit 100 includes an example apparatus and/or rod pump controller 146. In this example, data from and/or associated with the pumping unit 100 is received by an input/output (I/O) device 148 of the rod pump controller 146 and stored in a memory 150 that is accessible by a processor 152. As disclosed in further detail herein, the processor 152 can perform processes to determine, for example, an example pump fillage factor (e.g., based on the volume of fluid contained in the pump 126), an intake pressure of the pump 126, an example leakage proportionality constant (e.g., $in^2/lbf$), the volume of fluid leaked through the pump 126 (e.g., $in^3$) and/or the net fluid produced during a stroke of the pumping unit 100 and/or a given time period. In some examples, the components 148, 150, 152 of the apparatus 146 are disposed within a housing 147, which may be located at the site of the pumping unit 100. In other examples the apparatus 146 may be located in a remote location (e.g., at a base station or control room).

Several techniques have been proposed to calculate inferred production using a well site controller that can count the pump strokes and measure the effectiveness of the individual strokes. However, these known methods are hindered by the need for an independent estimate or measurement of the amount of leakage that occurs during each stroke. In U.S. patent application Ser. No. 13/187,330, filed Jul. 20, 2011, incorporated herein by reference in its entirety, a technique is set forth that applies a principle that has been derived from laboratory pump tests and, in particular, that the leakage through a pump is directly proportional to the pressure difference across the pump (e.g., the difference between the pressure inside the barrel 138 and the pressure above the piston 136). The pressure difference across a pump is directly proportional to the load or tension on a sucker rod string. A traditional diagnostic tool used with reciprocating rod pumps is called the dynamometer card, which is a plot of load (e.g., force) versus position (e.g., linear displacement) for a single stroke of a pumping unit. Two types of dynamometer cards are typically used. The first type of dynamometer card is the surface card, which is based upon measurements taken at the surface and displays polished rod load versus polished rod position. The second type of dynamometer card is referred to as the pump dynamometer card and is computed using data collected for the surface dynamometer card and a mathematical computation process that models the flexibility of the sucker rod string.

Figure 2:
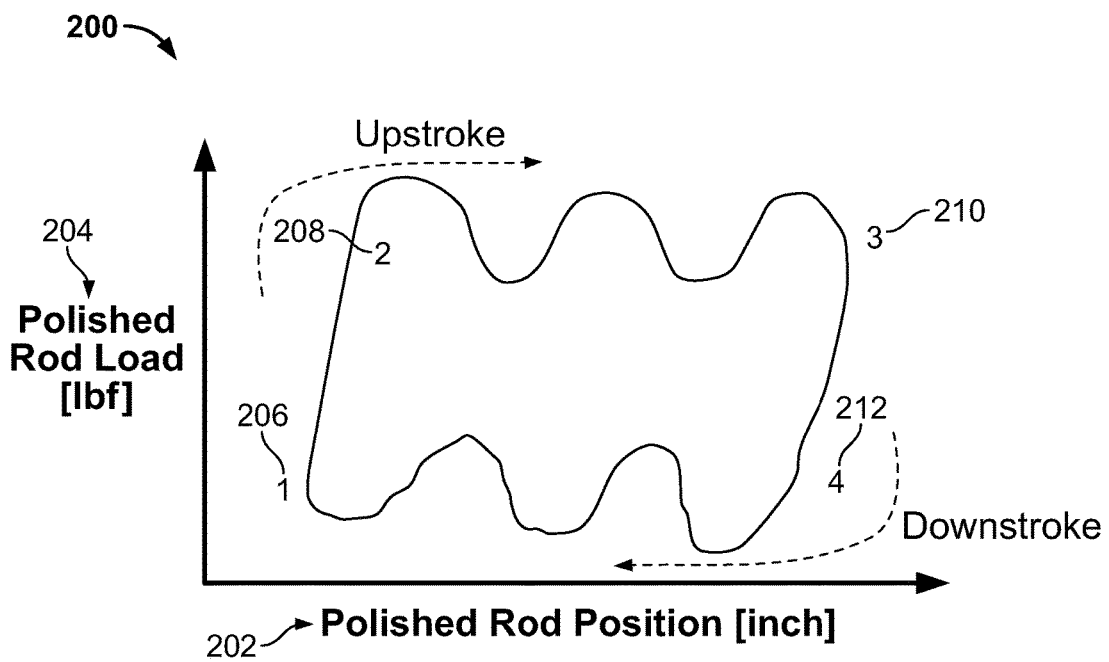
FIG. 2 shows an example surface dynamometer card that may be produced in accordance with the teachings of this disclosure.

FIG. 2 shows an example surface dynamometer card 200 that can be generated in accordance with the teachings of this disclosure using data associated with the vertical displacement of the polished rod 130 versus time and data associated with tension on the polished rod 130 versus time. In some examples, the surface dynamometer card 200 represents a scenario in which the downhole pump 126 is operating normally with adequate liquid to pump. As shown in FIG. 2, the x-axis 202 corresponds to the position of the polished rod 130 and the y-axis 204 corresponds to the load on the polished rod 130.

In the illustrated example of FIG. 2, reference number 206 (at point 1) corresponds to when the polished rod 130 begins its upward motion (e.g., upstroke) to begin to lift a column of fluid. Between reference numbers 206 and 208 (at point 2), the increase in tension on the polished rod 130 is shown as the polished rod 130 is stretched and the fluid column is lifted. Reference number 208 corresponds to when the pumping unit 100 is supporting the weight of the rod string 134 and the weight of the accelerating fluid column. Between reference numbers 208 and 210 (at point 3), force waves arrive at the surface as the upstroke continues, which causes the load on the polished rod 130 to fluctuate. Reference number 210 corresponds to when the polished rod 130 has reached its maximum upward displacement. Between reference numbers 210 and 212 (at point 4), the fluid load is transferred from the rod string 134 to the tubing string 132, which causes the tension in the polished rod 130 to decrease. Reference number 212 corresponds to when the load has substantially and/or completely transferred to the tubing string 132. Between reference numbers 212 and 206, force waves reflect to the surface as the downstroke continues, which causes irregular loading on the polished rod 130 until the polished rod 130 reaches its lowest point and begins another stroke.

Figure 3:
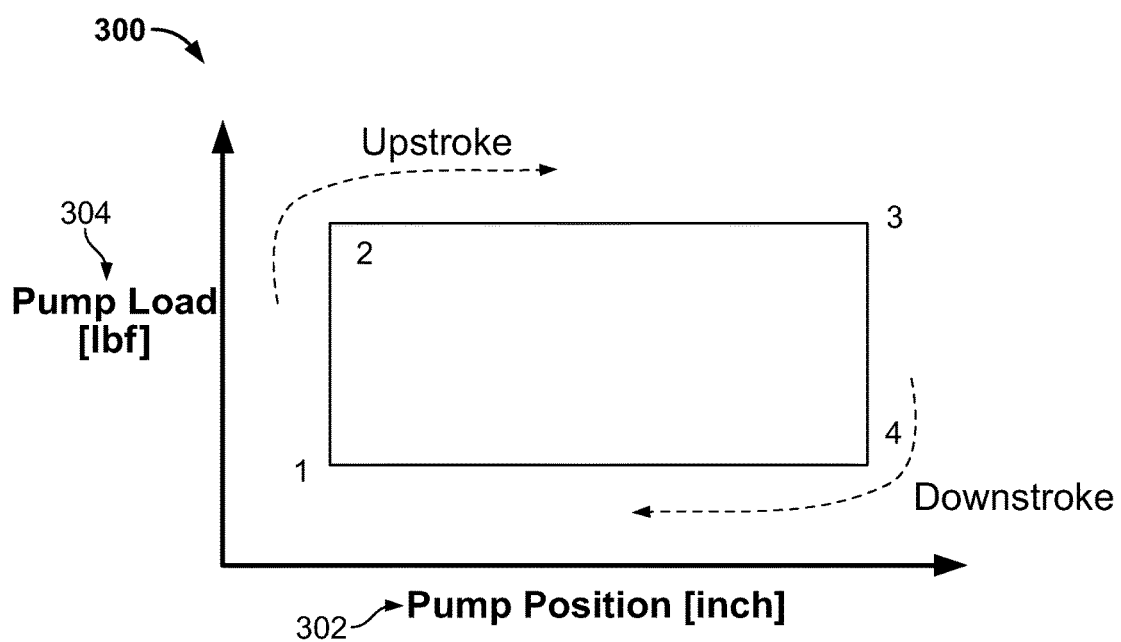
FIG. 3 shows an example pump dynamometer card that can be produced in accordance with the teachings of this disclosure.

FIG. 3 shows an example pump dynamometer card 300 that can be generated in accordance with the teachings of this disclosure using data associated with the position of the polished rod 130 and the load on the polished rod 130. In some examples, the pump dynamometer card 300 is generated using data measured at the surface. As shown in FIG. 3, the x-axis 302 corresponds to the position of the downhole pump (e.g., the position of the piston 136) and the y-axis 304 corresponds to the load on the downhole pump. Points 1, 2, 3 and 4 from FIG. 2 are illustrated in FIG. 3. Using the pump card 300, the pressure difference across the pump 126 is proportional to the height (e.g., vertical extent) of the pump card 300. Therefore, the leakage through the pump 126 is directly proportional to the height of the pump card 300. Using the trapezoidal rule (or another similar technique) the measured data from a pumping unit stroke may be integrated to derive the area of the pump card 300. The total area of a pump dynamometer card represents the amount of work (e.g., force acting over a distance) performed. Thus, the area of the pump dynamometer card 300 represents the work performed by the pump 126.

Under ideal conditions (e.g., where the pump 126 is full and there is no tubing movement and/or leakage), if the discharge pressure (e.g., the pressure of the fluid above the piston 136) and the intake pressure of the pump 126 (e.g., the pressure of the fluid below the piston 136) are known or estimated, the area of the card 300 can be used to determine the ideal production fluid volume $V_{stroke}$ using Equation 1 below.

$$V_{stroke} = \frac{A_{PC}}{\Delta P} \quad \text{Equation 1}$$

In Equation 1, $V_{stroke}$ represents the ideal (e.g., no leakage) volume of fluid produced during a stroke (e.g., in$^3$), $A_{PC}$ represents the area of a pump card (e.g., in-lbf) for the stroke, and $\Delta P$ represent the pressure across the piston 136 (e.g., the difference between the pump discharge pressure and the pump intake pressure) (e.g., in lbf/in$^2$). However, the relationship set forth in Equation 1 can only be used for a full pump card in a well that has anchored tubing. In particular, in some instances the tubing 132 is anchored or secured to prevent the tubing 132 from moving and/or stretching during operation. If the tubing 132 is unanchored, the tubing 132 may move and/or stretch during operation. As a result, the area of the pump card 300 may be affected.

Figure 4:
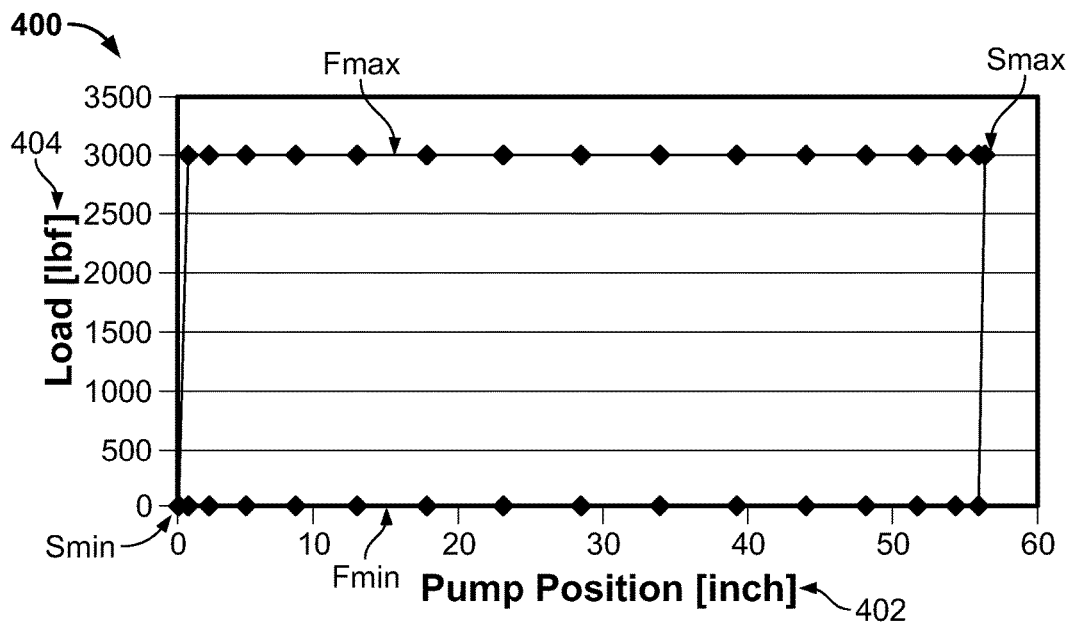
FIG. 4 shows an example pump dynamometer card produced by a pumping unit having anchored tubing.

For example, FIG. 4 shows an example ideal "full" pump dynamometer card 400 for a well (e.g., the well 102) with anchored tubing. The x-axis 402 corresponds to the position of the downhole pump and the y-axis 404 corresponds to the load on the downhole pump. As illustrated in FIG. 4, the shape of the card 400 is substantially rectangular. Even with the irregularities that may exist, the ideal area $A_{PCI}$ for a pump card can be determined (e.g., approximated) using Equation 2 below.

$$A_{PCI} = (S_{max} - S_{min}) \times (F_{max} - F_{min}) \quad \text{Equation 2}$$

In Equation 2, $A_{PCI}$ represents the ideal area of the pump card (e.g., in/lbf), $S_{max}$ represents the maximum pump position (e.g., in), $S_{min}$ represents the minimum pump position (e.g., in), $F_{max}$ represents the maximum pump load (e.g., lbf) and $F_{min}$ represents the minimum pump load (e.g., lbf), which have been labeled in FIG. 4.

Figure 5:
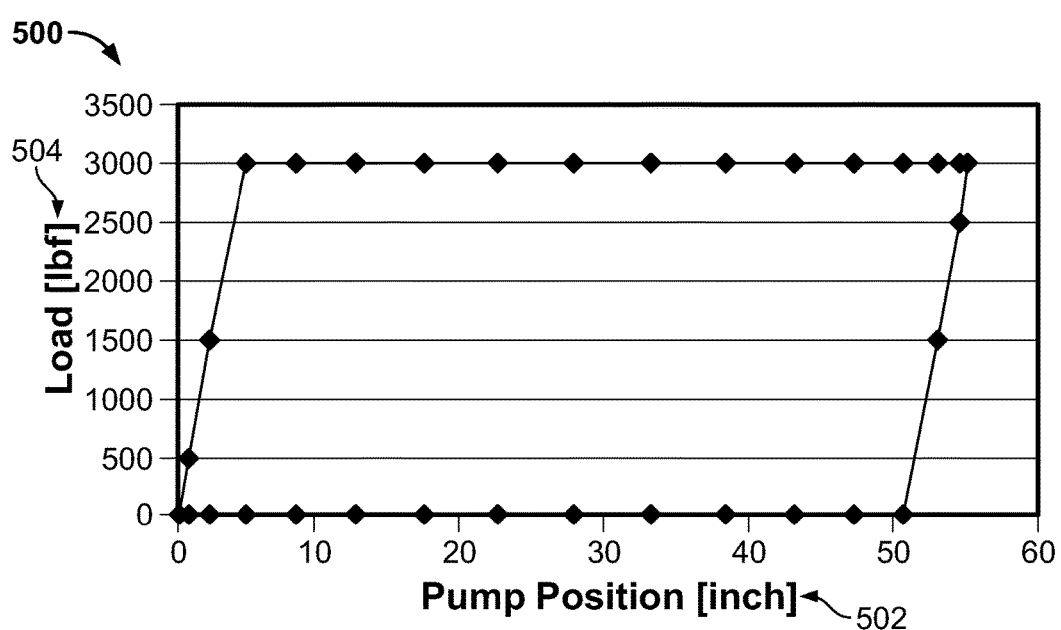
FIG. 5 shows an example pump dynamometer card produced by a pumping unit having unanchored tubing.

In some instances, as explained above, the tubing is not anchored or secured. As a result the tubing may stretch during operation, thereby affecting the area of the pump card. FIG. 5 shows an example ideal "full" pump dynamometer card 500 for a well (e.g., the well 102) with unanchored tubing. The x-axis 502 corresponds to the position of the downhole pump and the y-axis 504 corresponds to the load on the downhole pump. As illustrated in FIG. 5, the pump card 500 is in the shape of a parallelogram. In particular, the slopes of the sides of the pump card 500 are less steep than the sides of the pump card 400, for example. The slopes of the sides of the pump card 500 reflect the stretching and relaxation of the tubing string as the fluid load is transferred from the sucker rods 134 (e.g., on the upstroke) to the tubing 132 (e.g., on the downstroke). The slopes of the sides of the pump card dF/ds may be determined using Equation 3 below.

$$\frac{dF}{ds} = E \times \frac{A_{tubing}}{(12.0 \times L)} \quad \text{Equation 3}$$

In Equation 3, dF/ds represents the slope of the sides of the pump card (e.g., lbf/in), E represents the modulus of elasticity of the tubing material (e.g., lbf/in$^2$), $A_{tubing}$ represents the cross-sectional area of the tubing (e.g., in$^2$) and L represents the length of the unanchored tubing (e.g., ft). As illustrated in FIG. 5, the pump card 500 is not a rectangle like the pump card 400 in FIG. 4. As such, Equation 2 cannot be applied to accurately measure the area of the pump card

500. The ideal area $A_{PCI}$ for a pump card associated with unanchored tubing may be determined using Equation 4 below.

$$A_{PCI}=[(S_{max}-S_{min})\times(F_{max}-F_{min})]A_{TM} \quad \text{Equation 4}$$

In Equation 4, $A_{TM}$ represents the sum of the two triangular areas on the sides of the parallelogram (e.g., in-lbf), which can be determined using Equation 5 below.

$$A_{TM} = \frac{[12.0\times(F_{max}-F_{min})^2\times L]}{(E\times A_{tubing})} \quad \text{Equation 5}$$

The value for $A_{TM}$ determined using Equation 5 can be used in Equation 4 to determine the ideal area $A_{PCI}$ of the pump card.

Figure 6:
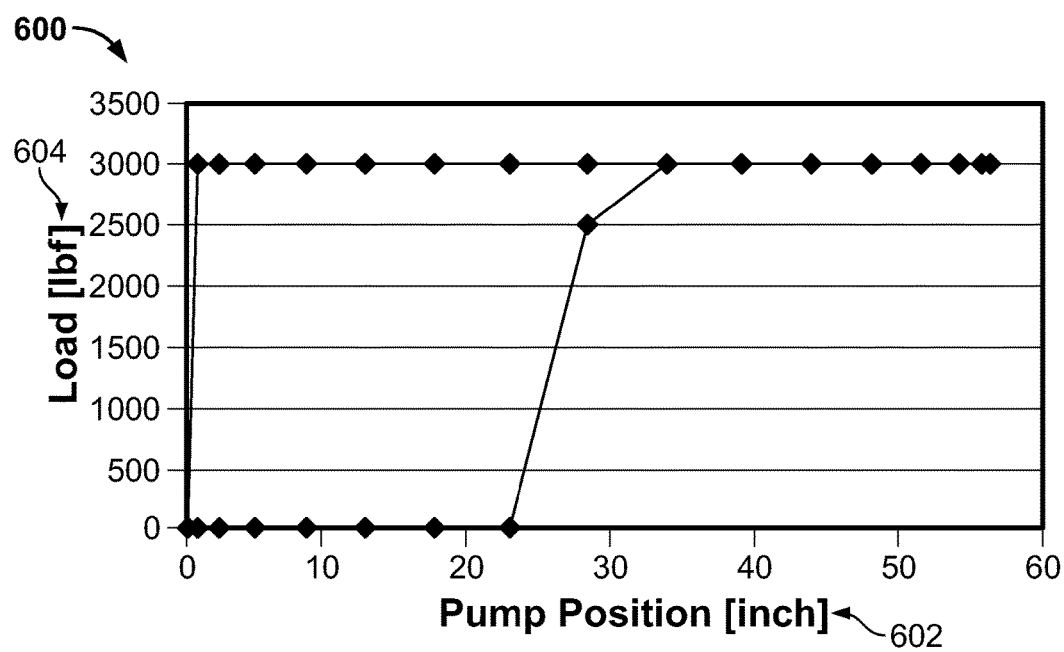
FIG. 6 shows an example pump dynamometer card produced by a pumping unit in which the pump is not full during the down stroke.

Another problem that exists and that may affect the production volume is pump fillage. FIG. 6 shows an example pump dynamometer card 600 for a well (e.g., the well 102) with anchored tubing that is about %50 full. The x-axis 602 corresponds to the position of the downhole pump and the y-axis 604 corresponds to the load on the downhole pump. When the pump 126 is not full, the pump card 600 retraces itself during the empty portion of the downstroke until the fluid is encountered by the piston 136. In other words, during a downstroke, the pump 126 should ideally be full of fluid. As such, the pressure of the fluid above and below the piston 136 is the same and, thus, the load on the pump 126 during the downstroke is typically zero. However, if the pump 126 is not full of fluid, then the piston 136 supports the column of fluid above the pump 126 as the piston 126 moves downward during the downstroke. Once the piston 136 encounters the fluid in the pump 126, the pressure above and below the piston 136 stabilizes and, thus, the load on the pump 126 moves to zero. As compared to FIG. 4, the pump card 400 in FIG. 4 includes a larger area than the pump card 600 in FIG. 6. The ideal area $A_{PCI}$ of the pump card 600 may be determined using Equation 6 below.

$$A_{PCI}=\{[(S_{max}-S_{min})\times(F_{max}-F_{min})]-A_{TM}\}\times\eta \quad \text{Equation 6}$$

In Equation 6, $A_{TM}$ represents the sum of the triangular areas (e.g., as calculated using Equation 5) and $\eta$ represents a pump fillage factor (e.g., a fraction). Therefore, Equation 6 combines the pump fillage aspect with the tubing movement aspect to accurately determine the area of a pump card. For wells that are anchored, the length of the unanchored tubing L in Equation 5 is zero, which causes the value of $A_{TM}$ in Equation 6 to be zero. Equation 6 can be rearranged to solve for the pump fillage factor $\eta$, as shown in Equation 7 below.

$$\eta = \frac{A_{PC}}{\{[(S_{max}-S_{min})\times(F_{max}-F_{min})]-A_{TM}\}} \quad \text{Equation 7}$$

In Equation 7, $A_{PC}$ represents the actual integrated card area (e.g., in-lbf), which may be determined using the trapezoidal rule, for example. Equation 7 provides a means of determining (e.g., estimating) pump fillage factor $\eta$ using known parameters (e.g., attributes) of a tubing string and a pump dynamometer card. Therefore, an example method or process for determining the pump fillage factor $\eta$ may include computing a surface dynamometer card (e.g., the surface dynamometer card 200), computing (e.g., calculating) a pump dynamometer card (e.g., the pump dynamometer card 600, which may be based on a surface dynamometer card), analyzing the pump dynamometer card for maximum and minimum positions and maximum and minimum loads ($S_{max}$, $S_{min}$, $F_{max}$, $F_{min}$), integrating the pump dynamometer card to determine the true or actual area $A_{PC}$, calculating the triangular areas $A_{TM}$ using Equation 5 (if the tubing is unanchored) (L, E and A are known from the tubing configuration) and calculating the pump fillage factor $\eta$ using Equation 7. This process may be performed by the processor 152 of the rod pump controller 146, for example. The pump fillage factor $\eta$ may be determined for each stroke of the pumping unit 100. In some examples, the pump fillage factor $\eta$ may be monitored and may be used to control the speed and/or on/off operations of the motor 110. For example, if the pump fillage factor $\eta$ falls below a threshold or target value, the speed of the motor 110 may be decreased. As a result, there is relatively more time for the pump 126 to fill between strokes.

As disclosed herein, pump leakage occurs when there is a pressure difference across the pump 126. Therefore, any time a pump card shows a positive load on the pump 126, a pressure difference across the pump 126 is present. Additionally, the leakage rate is proportional to the pressure difference across the pump 126. Because a pressure difference across the pump is proportional to the load on the pump card, the leakage rate is proportional to the pump card load. The pump leaks on the upstroke because there is a pressure difference across the pump (e.g., as indicated by the load on the pump 126 during the upstroke). Additionally, the pump 126 may leak on the downstroke when fillage is less than 100%, because a pressure difference across the pump 126 exists when the pump 126 is less than 100% full. Considering the fact that the discrete values used to calculate pump dynamometer cards are spaced equally in time, the volume of fluid leakage LKG can be determined (e.g., approximated) using Equation 8 below.

$$LKG=C_{LKG}\times A_{PC}\times(2.0-\eta) \quad \text{Equation 8}$$

In Equation 8, LKG represents the volume of fluid leaked through a pump (e.g., in$^3$) and $C_{LKG}$ represents a leakage proportionality constant (e.g., in$^2$/lbf). The (2.0–$\eta$) term in Equation 8 accounts for leakage on the downstroke. If the pump 126 is full (e.g., the volume of the bore 138 beneath the piston 136), then pump fillage factor $\eta$ is 1.0, and the (2.0–$\eta$) term becomes 1.0. However if the pump 126 is less than full such as %50, the pump fillage factor $\eta$ is 0.5 and the (2.0–$\eta$) term becomes 1.5, which reflects the leakage occurred during half of the downstroke. Once the volume of leaked fluid LKG is known, net production for a pump stroke IP$_{stroke}$ can be determined using Equation 9 below.

$$IP_{stroke}=V_{stroke}-LKG \quad \text{Equation 9}$$

Equations 1 and 8 may be combined into Equation 9 to produce Equation 10 below for the net production of a pump stroke IP$_{stroke}$.

$$IP_{stroke} = A_{PC}\left\{\left(\frac{1}{\Delta P}\right)-[C_{LKG}\times(2.0-\eta)]\right\} \quad \text{Equation 10}$$

In general, the pressure difference $\Delta P$ term in Equation 10 can be problematic to estimate from known or measured operational parameters. As disclosed herein, the example methods and apparatus consider that the pressure across the pump $\Delta P$ is proportional to the pump load. A relationship for determining an instantaneous pressure measurement $\Delta P_i$ may be determined using Equation 11 below.

$$\Delta P_i = \frac{(F_i)}{A_{pump}} \qquad \text{Equation 11}$$

In Equation 11, $\Delta P_i$ represents the instantaneous pressure across a pump (e.g., lbf/in$^2$), $F_i$ represents instantaneous pump force (e.g., lbf) and $A_{pump}$ represents a cross-sectional area of the pump (e.g., in$^2$). To derive an average or mean force $F_{avg}$ on the pump 126 for a complete or full stroke (e.g., an upstroke and a downstroke), the average force $F_{avg}$ can be determined used Equation 12 below.

$$F_{avg} = \frac{A_{PC}}{[(S_{max} - S_{min}) \times \eta]} \qquad \text{Equation 12}$$

Applying Equation 12 to Equation 11 leads to Equation 13 below.

$$\Delta P_{avg} = \frac{A_{PC}}{[A_{pump} \times (S_{max} - S_{min}) \times \eta]} \qquad \text{Equation 13}$$

In Equation 13, $\Delta P_{avg}$ represents the average pressure across the pump during times when leakage is occurring (e.g., lbf/in$^2$). Substituting Equation 13 into Equation 10 yields Equation 14 below, which provides an accurate method of inferring (e.g., estimating) the net production $IP_{stroke}$ from a single stroke of a pumping unit.

$$IP_{stroke} = [A_{pump} \times (S_{max} - S_{min}) \times \eta] - [A_{PC} \times C_{LKG} \times (2.0 - \eta)] \qquad \text{Equation 14}$$

From Equation 14, production $P_{observed}$ for a series of strokes of the pumping unit can be estimated using Equation 15 below.

$$P_{observed} = \Sigma\{[A_{pump} \times (S_{max} - S_{min}) \times \eta] - [A_{PC} \times C_{LKG} \times (2.0 - \eta)]\} \qquad \text{Equation 15}$$

In Equation 15, $P_{observed}$ represents the total observed production during the series of strokes (e.g., in$^3$) and $\Sigma$ represents a summation of terms for all strokes during the observation period (e.g., for two strokes, eight strokes, etc.). Equation 15 can be rearranged to solve for the leakage proportionality constant $C_{LKG}$, which yields Equation 16 below.

$$C_{LKG} = \frac{\{A_{pump} \times [\Sigma(S_{max} - S_{min}) \times \eta] - P_{observed}\}}{\{\Sigma[A_{PC} \times (2.0 - \eta)]\}} \qquad \text{Equation 16}$$

In some examples, a calibration process may be performed to derive the leakage proportionality constant $C_{LKG}$. For example, a producing well may be coupled to a dedicated 2-phase or 3-phase separator, which can measure liquid production from the well over a time period (e.g., 6 hours, 1 day, etc.) and/or for a certain number of strokes. For example, a separator 154 is illustrated in FIG. 1 that may separate oil from water and gas and determine a volume of produced oil. The processor 152 may measure required parameters, calculate pump dynamometer cards (e.g., for each of the stroke) and perform calculations disclosed herein to determine a value for the $\Sigma(S_{max}-S_{min})\times\eta$ term (e.g., a first summation term) and a value for the $\Sigma A_{PC}\times(2.0-\eta)$ term (e.g., a second summation term) based on the strokes of the pumping unit during the calibration period. At the end of the calibration period, the observed total liquid (oil and water) production $P_{observed}$ and the summation terms $\Sigma(S_{max}-S_{min})\times\eta$ and $\Sigma A_{PC}\times(2.0-\eta)$ may be used in Equation 16 to derive a value for the leakage proportionality constant $C_{LKG}$. The value for the leakage proportionality constant $C_{LKG}$ can then be used to infer or determine production for a single stroke (e.g., using Equation 14) or for multiple strokes over a period of time (e.g., using Equation 15). In other words, given the leakage proportionality constant $C_{LKG}$ (which may be derived using the example process above or another means), the inferred production of an individual stroke can be determined using Equation 14 and values available from a downhole dynamometer card. The inferred production from individual strokes may be accumulated over a period of time (e.g., an hour, a day, a month, etc.), which may be determined using Equation 15.

Equation 13 above provides a means of determining or estimating the pressure difference $\Delta P$ across the pump 126 using known attributes of the pump 126 and a pump dynamometer card. Pump intake pressure PIP may be determined using Equation 17 below.

$$PIP = PDP - \Delta P_{pump} \qquad \text{Equation 17}$$

In Equation 17, PIP represents the pump intake pressure (e.g., lbf/in$^2$), PDP represents pump discharge pressure (e.g., lbf/in$^2$) and $\Delta P_{pump}$ represents the pressure difference across the pump (which can be determined using Equation 13). A number of methods can be used to determine (e.g., estimate) the pump discharge pressure PDP. The fluid contained in the production tubing can be treated as a flowing or as a static vertical column of fluid. In some examples, because the fluid flow is cyclic (e.g., reciprocating rod pump systems only pump during upstroke) and the flow rates are relatively low, the friction pressure loss in the vertical column is often ignored. However, the density changes in the fluid column should be considered. For example, an example process may include starting at the surface with the surface discharge pressure (e.g., measured via a sensor), and incrementally calculating the pressure down the tubing string 132 (FIG. 1). An example method or process may include (e.g., assuming fixed density within a section or discrete increment) (1) obtaining estimates of oil, water and gas production rates for a well; (2) obtaining or approximating pressure, volume and temperature (PVT) relationships of the liquid components over reasonable pressure and temperature ranges; (3) measuring or estimating surface discharge pressure and temperature; (4) using PVT characteristics, along with pressure and temperature estimates to calculate the density of the presumed oil, water and gas mixture at discharge pressure and temperature; (5) assuming the constant density over a discrete increment of depth or pressure; (6) calculating or estimating the depth, pressure and temperature at the bottom of the discrete increment; (7) determining if the pump depth has been reached, using the currently calculated pressure as the pump discharge pressure; and (8) if the pump depth has not been reached, returning to step 4. In this example, the PVT relationships may be estimated using oil and gas gravity measurements, empirical correlations and/or estimates of pressure and temperatures, which may be stored in the memory 150, for example. Additionally or alternatively, a complex equation of state model may be used. In some examples, a processor (e.g., the processor 152) may estimate pump discharge pressure, estimate pressure difference across the pump at the end of each stroke (e.g., using Equation 13) and apply Equation 17 to derive an estimated pump intake pressure.

In some examples, the results of this example process may result in a relatively noisy pump intake pressure measurement (e.g., the pump intake pressure estimates may vary from stroke to stroke). In such an example, a damping function or low gain proportional-integral-derivative (PID) controller may be used, such that the processor can perform either on/off or variable speed control of the pumping system. In on/off control mode, for example, the rod pump controller 146 may stop the pump 126 (e.g., stop the motor 110) and place the pumping unit 100 into temporary idle time when the estimated pump intake pressure is below the pump intake pressure threshold for a specified number of strokes. In a variable speed control mode, for example, the rod pump controller 146 may decrease pump speed when the estimated pump intake pressure is below the threshold and increase pump speed when the estimated pump intake pressure is above the threshold.

While an example manner of implementing the apparatus 146 is illustrated in FIG. 1, one or more of the elements, processes and/or devices illustrated in FIG. 1 may be combined, divided, re-arranged, omitted, eliminated and/or implemented in any other way. Further, the example I/O device 148, the example memory 150, the example processor 152 and/or, more generally, the example apparatus 146 of FIG. 1 may be implemented by hardware, software, firmware and/or any combination of hardware, software and/or firmware. Thus, for example, any of the example I/O device 148, the example memory 150, the example processor 152 and/or, more generally, the example apparatus 146 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example I/O device 148, the example memory 150 and/or the example processor 152 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus of FIG. 1 may include one or more elements, processes and/or devices in addition to, or instead of, those illustrated in FIG. 1, and/or may include more than one of any or all of the illustrated elements, processes and devices.

Flowcharts representative of example methods for implementing the apparatus 146 of FIG. 1 are shown in FIGS. 7, 8, 9 and 10A and 10B. The methods of FIGS. 7, 8, 9 and 10A and 10B may be implemented machine readable instructions that comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example methods are described with reference to the flowcharts illustrated in FIGS. 7, 8, 9 and 10A and 10B, many other methods of implementing the example apparatus 146 may alternatively be used. For example, the order of execution of the blocks may be changed, and/or some of the blocks described may be changed, eliminated, or combined.

As mentioned above, the example methods of FIGS. 7, 8, 9 and 10A and 10B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 7, 8, 9 and 10A and 10B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
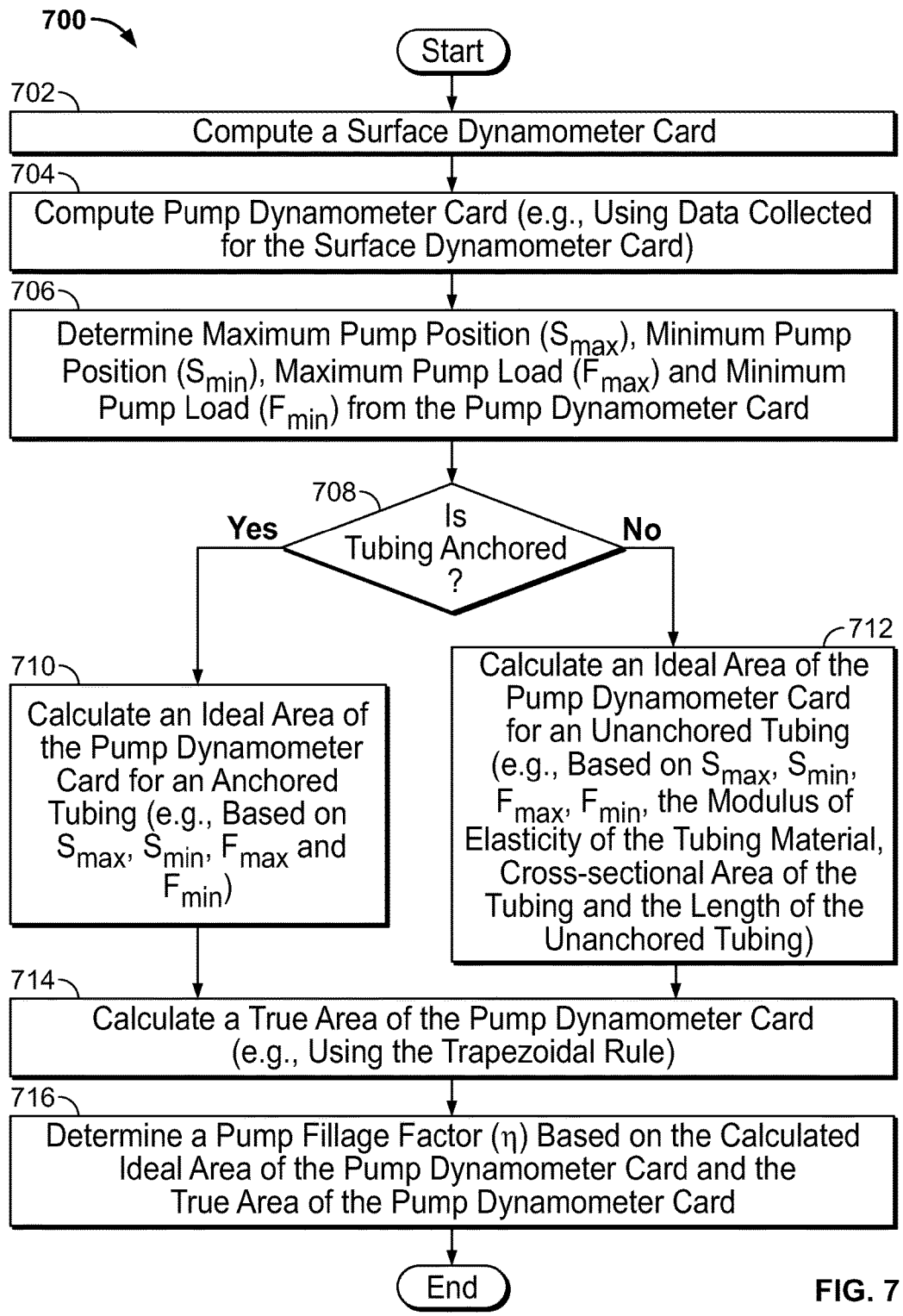
FIG. 7 is a flowchart representative of an example method of determining a pump fillage factor and which may be implemented with the example apparatus of FIG. 1.

FIG. 7 illustrates an example method 700 to calculate a pump fillage factor (e.g., fraction) for a pumping unit. The example method 700 may be implemented by the apparatus 146 (e.g., using the processor 152) of FIG. 1, for example, to calculate a pump fillage factor for the pump 126. The example method 700 includes computing a surface dynamometer card (block 702). As disclosed herein, a surface dynamometer card is based on measurements taken at the surface and displays polished rod load versus polished rod position. FIG. 2 illustrates an example surface dynamometer card 200 that may be computed for the example pumping unit 100 of FIG. 1. The surface dynamometer card may be computed by the processor 152 of FIG. 1, for example.

The example method 700 includes computing a pump dynamometer card (block 704). As disclosed herein, a pump dynamometer card may be computed using data collected for the surface dynamometer card and a mathematical computation process that models the flexibility of the sucker rod string. FIGS. 3, 4, 5 and 6 illustrate example pump dynamometer cards that may be computed for the example pumping unit 100 of FIG. 1. The pump dynamometer card may be computed by the processor 152 of FIG. 1, for example.

The example method 700 includes determining a maximum pump position $S_{max}$, a minimum pump position $S_{min}$, a maximum pump load $F_{max}$ and a minimum pump load $F_{min}$ from the pump dynamometer card (block 706). The pump positions and loads may be determined by the processor 152 of FIG. 1, for example.

The example method 700 of FIG. 7 includes determining whether a tubing (e.g., tubing string) of the pumping unit is anchored (bock 708). As disclosed herein, if the tubing of a pumping unit is unanchored, the tubing may flex and stretch during operation. As a result, the force on the pump may be relaxed at times. For example, FIG. 4 shows an example pump dynamometer card 400 have a well having anchored tubing and a FIG. 5 shows an example pump dynamometer 500 of a well having unanchored tubing. If the tubing is anchored, the example method 700 includes calculating an ideal area $A_{PCI}$ of the pump dynamometer card for an anchored tubing (block 710). The ideal area $A_{PCI}$ may be based on the maximum pump position $S_{max}$, the minimum pump position $S_{min}$, the maximum pump load $F_{max}$ and the minimum pump load $F_{min}$. For example, the ideal area $A_{PCI}$ may be calculated using Equation 2. If the tubing is unanchored, the example method 700 includes calculating an ideal area $A_{PCI}$ of the pump dynamometer card for unanchored tubing (block 712). The ideal area may be based on the maximum pump position $S_{max}$, the minimum pump position $S_{min}$, the maximum pump load $F_{max}$ and the minimum pump load $F_{min}$, the modulus of elasticity E of the tubing material, the cross-sectional area of the tubing $A_{tubing}$ and the length L of the unanchored tubing. For example, the ideal area $A_{PCI}$ of a pump dynamometer card for unanchored tubing may be calculated using Equation 4. The processor 152 of FIG. 1 may determine whether the tubing 136 is anchored or unanchored and may calculate the ideal area $A_{PCI}$ of the pump dynamometer card using the Equation 4.

The example method 700 includes calculating a true area $A_{PC}$ of the pump dynamometer card (block 714). The true area of the pump dynamometer card may be calculated using the trapezoidal rule, for example, or any other mathematical formula. The true area $A_{PC}$ of a pump dynamometer card may be calculated by the processor 152 of FIG. 1, for example. The example method 700 includes determining a pump fillage factor η based on the calculated ideal area $A_{PCI}$ of the pump dynamometer card and the true area $A_{PC}$ of the pump dynamometer card (block 716). For example, the pump fillage factor η may be determined using Equation 7. The pump fillage factor η may be determined by the processor 152 of FIG. 1, for example. The pump fillage factor η may be used to, among other things, determine intake pressure PIP of a pump and/or determine a leakage proportionality constant $C_{LKG}$, which can then be used to infer production and/or control a pumping unit more efficiently. In some examples, the pump fillage factor can be used to control the speed and/or on/off operation of the pump. For example, the pump fillage factor can be monitored and when the pump fillage factor falls below a target value (e.g., for one stroke or a specified number of strokes), the pump can be stopped (or decreased in speed) and the well can be left in idle to allow the well casing to be filled by the producing formation. Therefore, when pumping is resumed (at the end of idle time), sufficient fluid may be present to fill the pump.

Figure 8:
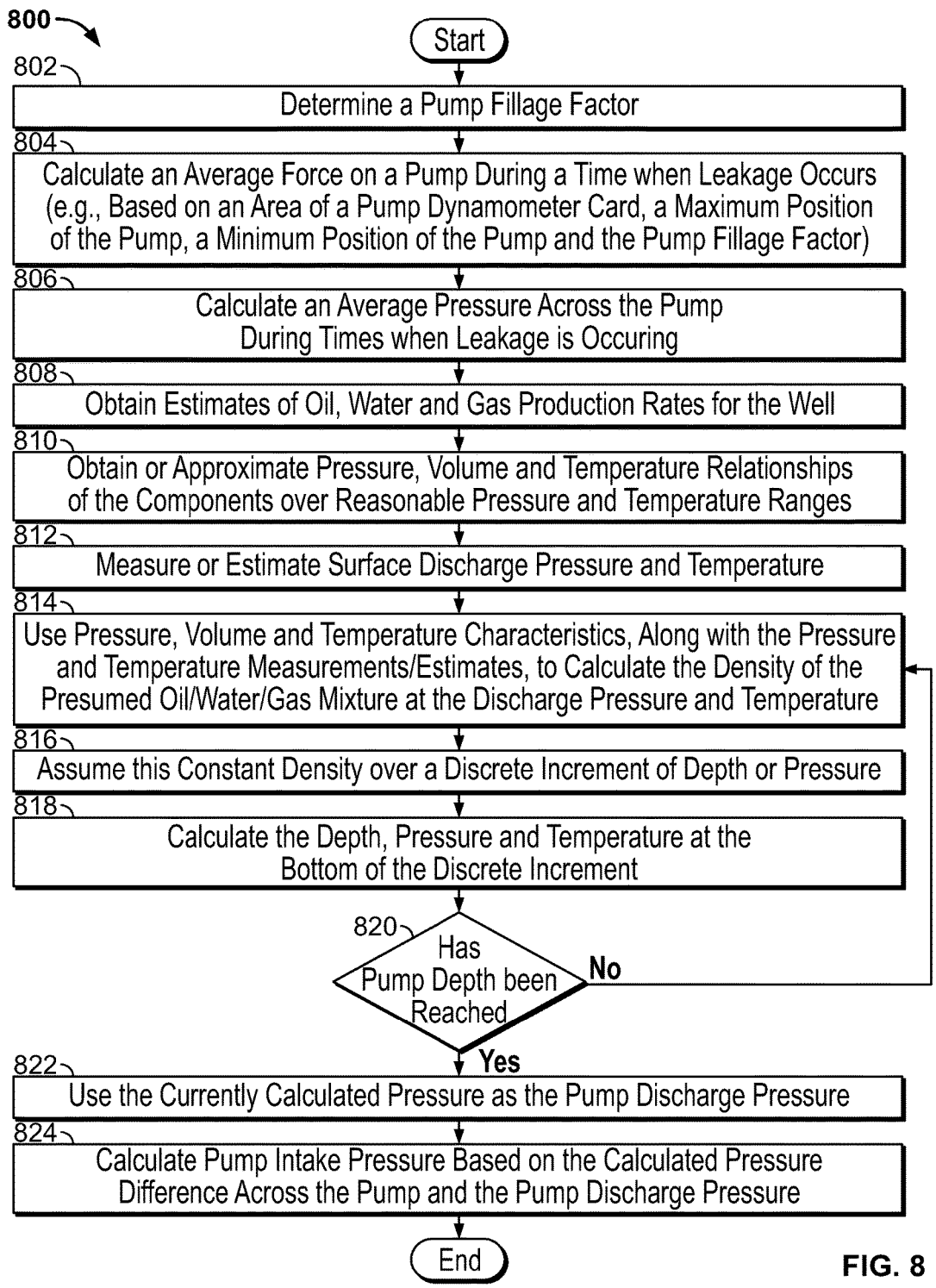
FIG. 8 is a flowchart representative of an example method of calculating pump intake pressure and which may be implemented with the example apparatus of FIG. 1.

FIG. 8 illustrates an example method 800 to calculate or determine intake pressure of a pump. The example method 800 may be implemented by the apparatus 146 (e.g., using the processor 152) of FIG. 1, for example, to determine intake pressure PIP of the pump 126. The example method 800 includes determining a pump fillage factor η (block 802). The pump fillage factor η may be determined using the example method 700 of FIG. 7, which may be implemented by the example apparatus 146 of FIG. 1. The example method 800 includes calculating an average force $F_{avg}$ on a pump during a time period when leakage occurs (block 804). The average force $F_{avg}$ may be based on, for example, an area $A_{PC}$ of a pump dynamometer card, a maximum position of the pump $S_{max}$, a minimum position of the pump $S_{min}$ and/or the pump fillage factor η. The area $A_{PC}$ of a pump dynamometer card, the maximum position of the pump $S_{max}$ and the minimum position of the pump $S_{min}$ are explained in connection with the method 700 of FIG. 7. The average force $F_{avg}$ may be determined using Equation 12, which may be implemented by the processor 152 of FIG. 1, for example.

The example method 800 includes calculating an average pressure $\Delta P_{avg}$ across the pump during times when leakage occurs (block 806). The average pressure $\Delta P_{avg}$ may be determined using Equation 13, which may be implemented by the processor 152 of FIG. 1, for example. In Equation 13, the average pressure $\Delta P_{avg}$ is based on the true area $A_{PC}$ of the pump dynamometer card, the cross-sectional area $A_{pump}$ of the pump, the maximum position of the pump $S_{max}$, the minimum position of the pump $S_{min}$ and the pump fillage factor η. The example method 800 includes obtaining estimates of oil, water and gas production rates for the well (block 808). The estimates for the production rates may be obtained by the processor 152 of FIG. 1, for example. The rates may be based on measurements from the separator 154. In other examples, the rates may be determined based on inferred production, such as determined in connection with the method in FIGS. 10A and 10B and disclosed in further detail herein.

The example method 800 of FIG. 8 includes obtaining or approximating pressure, volume and temperature relationships of the liquid components over pressure and temperature ranges (block 810) (e.g., pressure and temperature ranges that are appropriate for the operating conditions of the well). The relationships may be obtained or approximated by the processor 152 of FIG. 1, for example. In some examples, the relationships are stored on the memory 150. The example method 800 includes measuring or estimating surface discharge pressure and temperature (block 812). For example, the processor 152 of FIG. 1 may receive measurements via the I/O device 148 and determine a discharge pressure and temperature at the surface.

The example method 800 includes using pressure, volume and temperature characteristics, along with the pressure and temperature measurements/estimates, to calculate the density of the presumed oil/water/gas mixture at the discharge pressure and temperature (block 814). The density may be calculated by the processor 152 of FIG. 1, for example. The example method 800 includes assuming the constant density over a discrete increment of depth or pressure (block 816) and calculating the depth, pressure and temperature at the bottom of a discrete increment (block 818). The discrete increment may be any increment (e.g., 1 mm). The depth, pressure and temperature values may be calculated by the processor 152 of FIG. 1, for example.

The example method 800 includes determining when a pump depth has been reached (block 820). In other words, the method 800 includes determining whether the increment is the last or bottom most increment of the well. If not, the example method 800 includes using the pressure, volume and temperature characteristics to calculate the density and calculating the depth, pressure and temperature values at the bottom of the next discrete increment (blocks 814-818). This process may continue until the pump depth has been reached. If the pump depth has been reached, the method 800 includes using the currently calculated pressure as the pump discharged pressure (block 822) (e.g., the pressure value calculated at block 818) and calculating pump intake pressure based on the calculated pressure difference across the pump and the pump discharge pressure (block 824). The pump intake pressure may be calculated using Equation 17, which may be implemented by the processor 152 of FIG. 1, for example.

Figure 9:
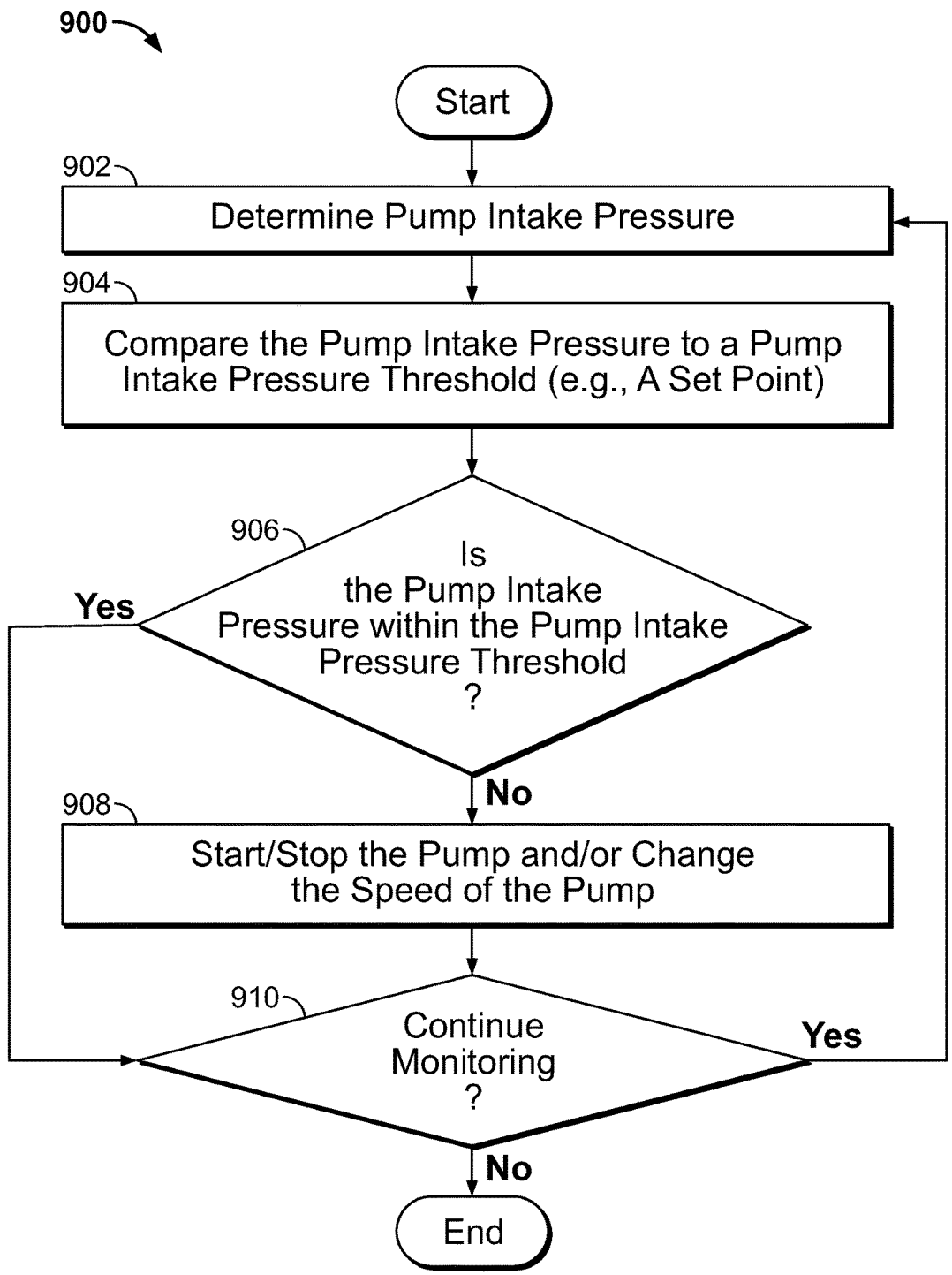
FIG. 9 is a flowchart representative of an example method of controlling a pumping unit based on pump intake pressure and which may be implemented with the example apparatus of FIG. 1.

FIG. 9 illustrates a flowchart representative of an example method 900 that may be used to operate a pumping unit based on pump intake pressure. The example method 900 may be implemented by the apparatus 146 (e.g., using processor 152) of FIG. 1, for example, to operate the pump 126 above or below a threshold intake pressure and/or pressure range. The example method 900 includes determining pump intake pressure (block 902), which may be determined using the example method 800 of FIG. 8. The example method 900 includes comparing the pump intake pressure to a pump intake pressure threshold (block 904). The pump intake pressure may be a range (e.g., having an upper limit and a lower limit). The pump intake pressure may be set by an operator. For example, the processor 152 of FIG. 1 may determine the intake pressure PIP of the pump 126 and compare the intake pressure PIP to a pump intake pressure threshold.

The example method 900 includes determining whether the pump intake pressure is within the pump intake pressure threshold (block 906). For example, the pump intake pressure may be higher than an allowed or threshold pump intake pressure. If the pump intake pressure is not within the pump intake pressure threshold, the example method 900 includes starting or stopping the pump and/or changing the speed of the pump (block 908). For example, the apparatus 146 of FIG. 1 may be used to control the motor 110 to increase or decrease the speed of the motor 110. As disclosed herein, in some examples it may be desired for the pump to operate above a set intake pressure threshold, which may enable lighter hydrocarbons to remain in liquid phase, for example. The example method 900 includes determining whether monitoring of the well is to continue (block 910). If monitoring is to continue, the example method 900 may repeat. Otherwise, the example method 900 may end.

Figure 10A:
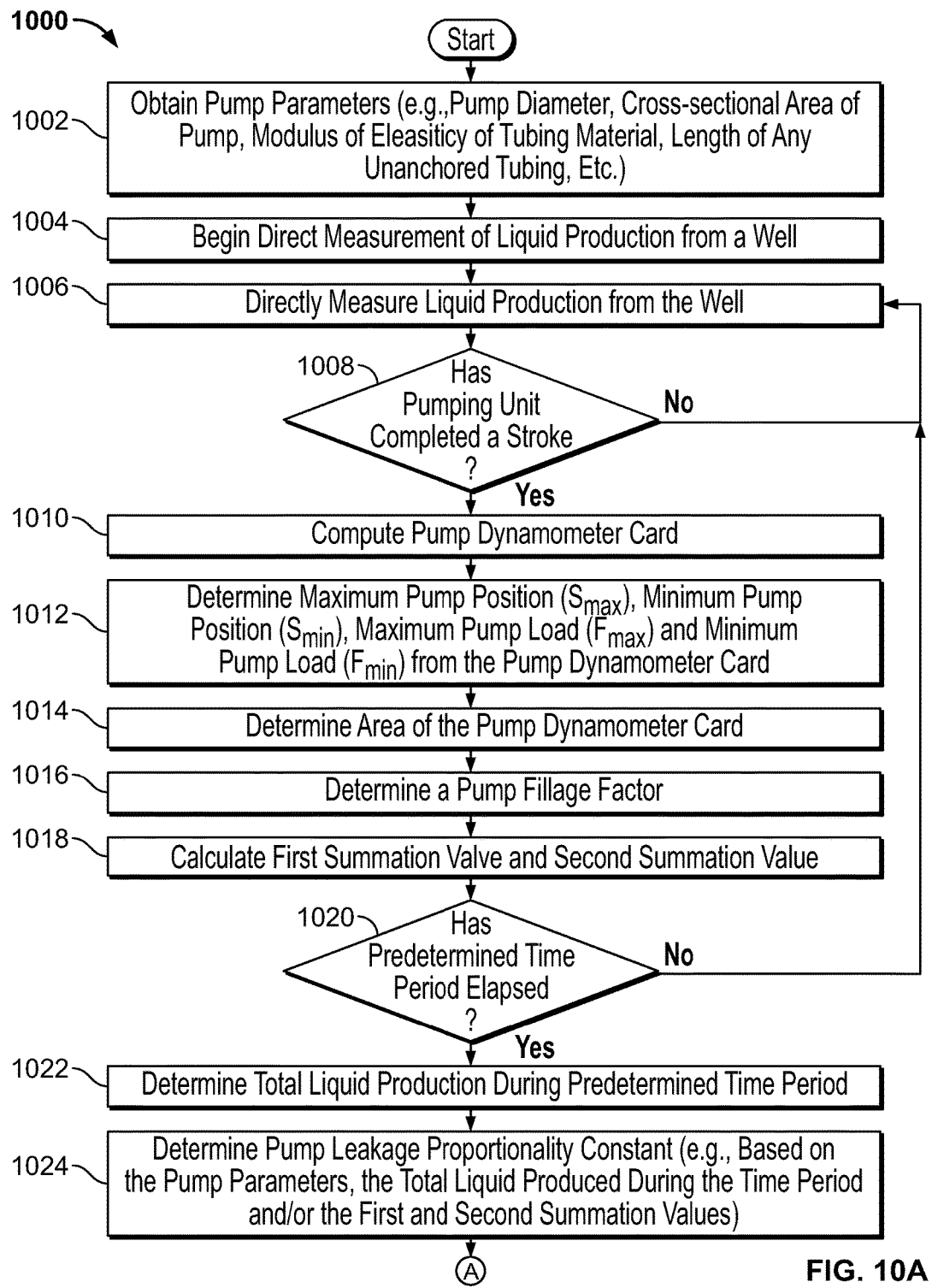
FIGS. 10A and 10B are a flowchart representative of an example method of determining production of a pumping unit and which may be implemented with the example apparatus of FIG. 1.
Figure 10B:
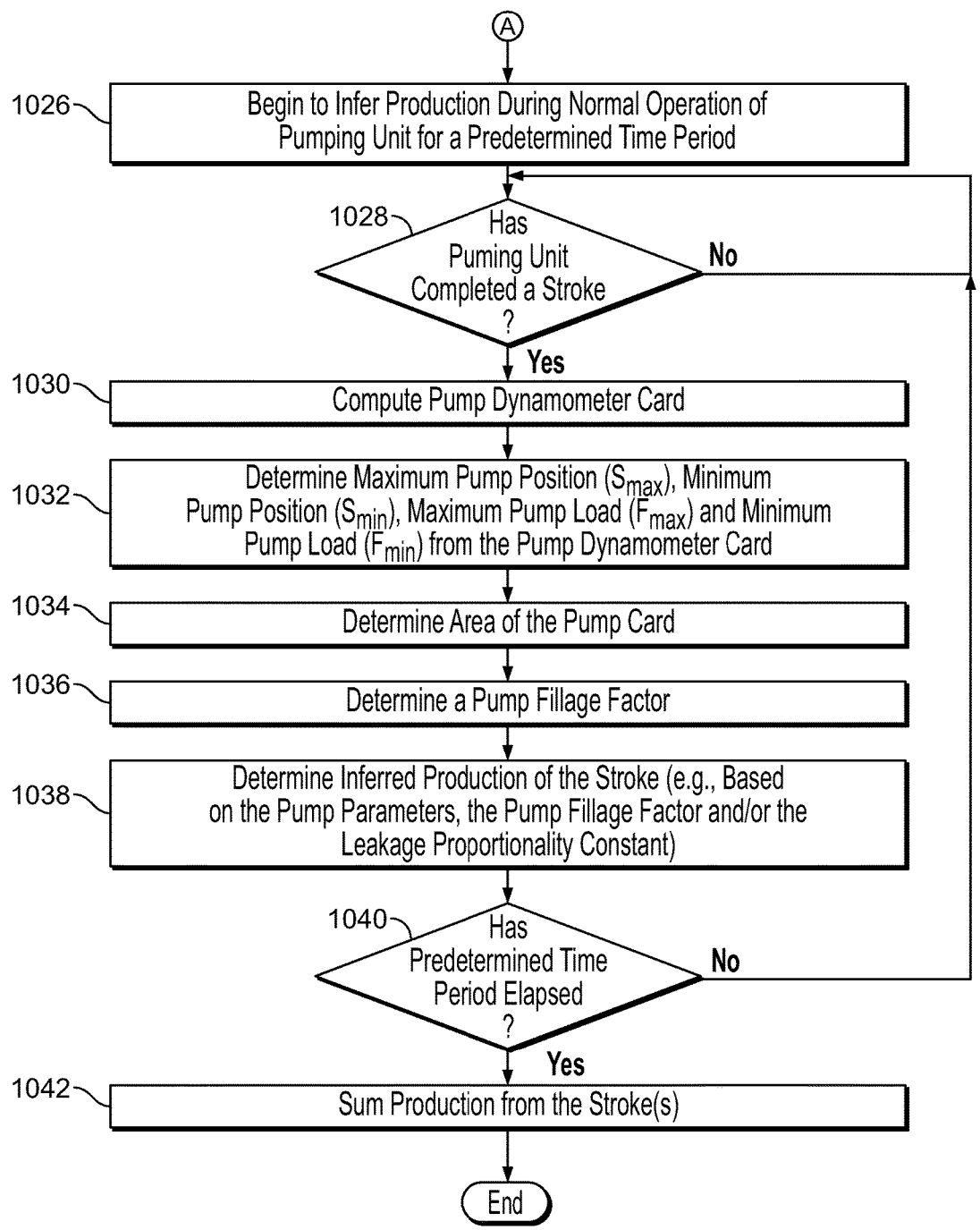

FIGS. 10A and 10B illustrate a flowchart representative of an example method 1000 that may be used to infer production of an oil well. The example method 1000 may be implemented by the apparatus 146 (e.g., using the processor 152) of FIG. 1, for example, to infer production of the well 102 by the pumping unit 100. The example method 1000 includes obtaining pump parameters or attributes such as a diameter of the pump, a cross-sectional area $A_{pump}$ of the pump, the modulus of elasticity E of the tubing material and/or the length L of any unanchored tubing (block 1002). The parameters or attributes may be obtained by the processor 152 of FIG. 1, for example. At block 1004, the process of directly measuring liquid production from a well (e.g., the well 102 of FIG. 1) for a first predetermined period of time and/or for a first predetermined number of strokes begins (block 1004). The liquid produced from the well (e.g., the well 102) is directly measured for one or more strokes of the pumping unit (e.g., the pumping unit 100) (block 1006). In some examples, the liquid is directly measured using a well test separator (e.g., the separator 154 of FIG. 1). The example method 1000 includes determining if the pumping unit has completed a stroke (block 1008). For example, the processor 152 may determine if the pumping unit 100 has completed a stroke. In some examples, the processor 152 determines that the pumping unit 100 completes a stroke based on feedback received from a sensor adjacent the crank arm 116. If a stroke of the pumping unit has not been completed, the method continues to directly measure the liquid produced from the well (block 1006).

If the pumping unit has completed a stroke (determined at block 1008), the example method 1000 includes computing a pump dynamometer card based on, for example, a determined surface dynamometer card and/or data collected for the surface dynamometer card (block 1010). The pump dynamometer card may be computed by the processor 152 of FIG. 1, for example. The example method 1000 includes determining a maximum pump position $S_{max}$, a minimum pump position $S_{min}$, a maximum pump load $F_{max}$ and a minimum pump load $F_{min}$ from the pump dynamometer card (block 1012). The pump positions and loads may be determined by the example processor 152 of FIG. 1, for example. The example method 1000 includes determining an area $A_{PC}$ of the pump dynamometer card (block 1014). For example, the processor 152 may determine the area $A_{PC}$ of a pump card using the trapezoidal rule.

The example method 1000 includes determining a pump fillage factor η (block 1016). The pump fillage factor η may be determined using the example method 700 of FIG. 7. The example method 1000 includes calculating a first summation value and a second summation value (block 1018) for the pump dynamometer cards of the stroke(s) that have occurred during the first predetermined time period and/or the first predetermined number of strokes. For example, the first summation value may be calculated using $\Sigma(S_{max}-S_{min})\times\eta$ for the stroke(s) occurred during the first predetermined time period, and the second summation value may be calculated using $\Sigma A_{PC}\times(2.0-\eta)$ for the stroke(s) occurred during the first predetermined time period. The first and second summation values may be determined by the processor 152 of FIG. 1, for example.

The example method 1000 includes determining whether the first predetermined time period has elapsed and/or if the first predetermined number of strokes of the pumping unit has occurred (block 1020). For example, the processor 152 of FIG. 1 may determine if the first predetermined time period has elapsed and/or the first predetermined number of strokes has occurred. If the first predetermined time period has not elapsed and/or if the predetermined number of strokes has not occurred, the liquid produced from the well continues to be measured (block 1006).

If the first predetermined time period has elapsed and/or if the predetermined number of strokes has occurred, the example method 1000 includes determining total liquid production $P_{observed}$ during the first predetermined time period and/or for the first predetermined number of strokes (block 1022). The example method 1000 includes determining a leakage proportionality constant $C_{LKG}$ (block 1024). The leakage proportionality constant $C_{LKG}$ may be based on the pump parameters (e.g., obtained at block 1002), the total liquid production $P_{observed}$ during the first predetermined time period and/or during the first predetermined number of strokes (e.g., obtained at block 1022) and/or the first summation value and the second summation value (e.g., obtained at block 1020). For example, the leakage proportionality constant $C_{LKG}$ may be determined using Equation 16, which may be implemented by the example processor 152 of FIG. 1.

The example method 1000, which continues in FIG. 10B, includes determining (e.g., inferring) production of the pumping unit during normal operation and/or while the pumping unit is continuously operating for a second predetermined time period (block 1026). The second predetermined time period may be, for example, an hour, a day, a week, a month, etc. The example method 1000 includes determining whether the pumping unit has completed a stroke (block 1028) (e.g., a complete cycle including an upstroke and a downstroke). If the pumping unit has not completed a stroke, the method 1000 iteratively determines if a stroke has completed. If the pumping has completed a stroke (e.g., determined by the processor 152), the example method 1000 includes computing a pump dynamometer card (block 1030). The pump dynamometer card may be based on, for example, a determined surface dynamometer card. The pump dynamometer card may be computed by the processor 152 of FIG. 1, for example.

The example method 1000 includes determining a maximum pump position $S_{max}$, a minimum pump position $S_{min}$, a maximum pump load $F_{max}$ and a minimum pump load $F_{min}$ from the pump dynamometer card (block 1032). The pump positions and loads may be determined by the example processor 152 of FIG. 1, for example. The example method 1000 includes determining an area $A_{PC}$ of the pump dynamometer card (block 1034). For example, the processor 152 may determine the area $A_{PC}$ of a pump card using the trapezoidal rule. The example method 1000 includes determining a pump fillage factor η (block 1036). The pump fillage factor η may be determined using the example method 700 of FIG. 7. For example, the processor 152 may determine the pump fillage factor η using Equation 7.

The example method 1000 includes determining inferred production of the stroke of the pumping unit (block 1038). The production of the pumping unit may be based on the pump parameters (e.g., obtained at block 1002), the pump fillage factor η (e.g., obtained at block 1036) and/or the leakage proportionality constant $C_{LKG}$ (e.g., obtained block 1024). For example, the production $IP_{stroke}$ may be determined using Equation 14, which may be implemented by the processor 152 of FIG. 1. The example method 1000 includes determining whether the second predetermined time period has elapsed and/or the second predetermined number of strokes has occurred (block 1040). If the second predetermined time period has not elapsed and/or the second predetermined number of strokes has not occurred, the example method 1000 continues to block 1028 where the method 1000 continues to determine whether the pumping unit has completed another stroke. If the second predetermined time period has elapsed and/or the second predetermined number of strokes has occurred, the example method 1000 includes summing the production from the stroke(s) (block 1042). The total production $P_{observed}$ of all the stroke(s) may be determined using Equation 15, for example. The total production $P_{observed}$ may be determined by the processor 152 of FIG. 1, for example. The example method 1000 may repeat itself as desired. Otherwise, the example method 1000 may end.

Figure 11:
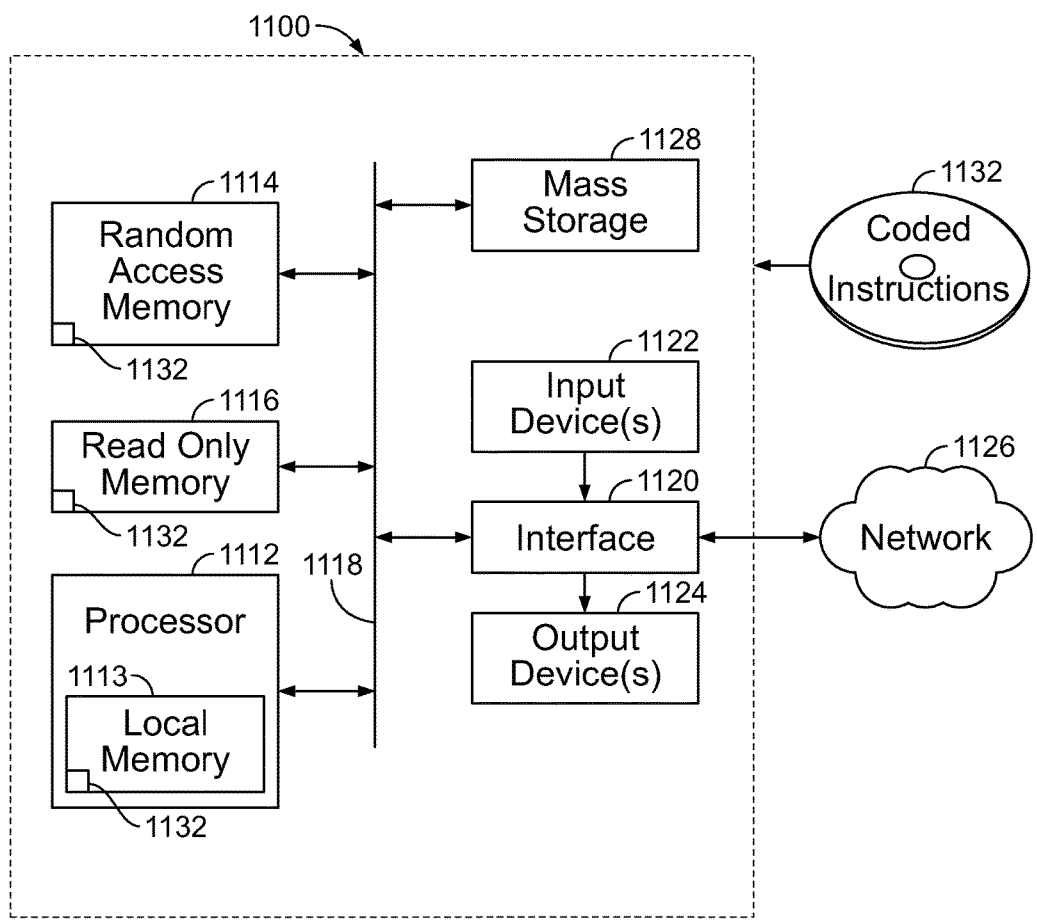
FIG. 11 is a processor platform to implement any of the example methods of FIG. 7, 8, 9 or 10A and 10B and/or the example apparatus of FIG. 1.

FIG. 11 is a block diagram of an example processor platform 1100 capable of executing instructions to implement the methods of FIGS. 7, 8, 9 and 10A and 10B and/or to implement the apparatus 146 of FIG. 1. The processor platform 1100 can be, for example, a server, a personal computer, a mobile device (e.g., a cell phone, a smart phone, a tablet such as an iPad™), a personal digital assistant (PDA), an Internet appliance or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 to implement the methods of FIGS. 7, 8, 9 and 10A and 10B may be stored in the mass storage device 1128, in the volatile memory 1114, in the non-volatile memory 1116, and/or on a removable tangible computer readable storage medium such as a CD or DVD.

From the foregoing, it will appreciated that the above disclosed methods, apparatus and articles of manufacture relate to determining the production of a downhole reciprocating pump by, for example, relating the work performed by a pumping unit on a sucker rod string to the work used to lift a single volumetric unit of fluid from the well. Using this relationship, the work performed by the pumping unit during a single stroke of the pumping unit can be used to estimate the amount of fluid produced during the stroke. The estimated production from each stroke can be summed over a period of time (e.g., hourly, daily, monthly, etc.) to infer, estimate and/or determine production estimate for the pumping unit.

In at least some examples, a rod pump controller does not calculate the downhole pump card. Thus, the examples disclosed herein can be incorporated on a computing platform of moderate to low computational power. Using the examples disclosed herein, there is no need to analyze the downhole pump card to identify the net liquid stroke, the fluid load or other such parameters from the downhole card. In at least some examples, a leakage test is not performed because the leakage proportionality constant is determined using calculations associated with a well test. The examples disclosed herein can be implemented in a field controller.

An example method disclosed herein includes measuring an amount of liquid produced from a well by a pumping unit during a predetermined time period and determining first areas of first pump cards during the predetermined time period. The example method includes summing the first areas and, based on the amount of liquid produced and the summed first areas, determining a leakage proportionality constant of a downhole pump of the pumping unit.

In some examples, the method also includes, while continuously operating the pumping unit, determining a second area of a second pump card. In some examples, the method also includes determining a net fluid produced during a stroke of the pumping unit based on the leakage proportionality constant and the second area. In some examples, measuring the amount of liquid produced includes measuring the liquid produced at separator conditions using a well test separator.

In some examples, determining the first areas of first pump cards during the predetermined time period includes using a rod pump controller to determine the first areas. In some examples, the method also includes, while continuously operating the pumping unit over a second predetermined time period, determining second areas of second pump cards. In some examples, the method also includes determining a net fluid produced during the second predetermined time period based on the proportionality constant and the second areas. In some examples, the leakage proportionality constant is determined further based on a pressure difference across the downhole pump of the pumping unit.

An example apparatus disclosed herein includes a housing for use with a pumping unit and a processor positioned in the housing. The processor is to determine first areas of first pump cards during a predetermined time period, sum the first areas and, based on an amount of liquid produced by a downhole pump of the pumping unit during the predetermined time period from a well and the summed first areas, determine a leakage proportionality constant of the downhole pump.

In some examples, while continuously operating the pumping unit, the processor is to determine a second area of a second pump card. In some examples, the processor is to determine a net fluid produced during a stroke of the pumping unit based on the leakage proportionality constant and the second area. In some examples, the apparatus includes a rod pump controller. In some examples, while continuously operating the pumping unit over a second predetermined time period, the processor is to determine second areas of second pump cards. In some examples, the processor is to determine a net fluid produced during the second predetermined time period based on the proportionality constant and the second areas. In some examples, the processor is to determine the leakage proportionality constant further based on a pressure difference across the downhole pump of the pumping unit.

Another example method disclosed herein includes measuring a first amount of liquid produced from a well by a pump during a first stroke of the pump, computing a first pump card based on the first stroke, determining a first area of the first pump card and determining a leakage proportionality constant of the pump based on the first amount of liquid produced and the first area. The example method also includes computing a second pump card based on a second stroke of the pump, determining a second area of the second pump card and determining a second amount of liquid produced by the pump during the second stroke based on the leakage proportionality constant and the second area.

In some examples, the method includes determining a first pump fillage factor for the pump during the first stroke. In such an example, the leakage proportionality constant is further based on the first pump fillage factor. In some such examples, the method includes determining an ideal area of the first pump card. The first pump fillage factor is based on a ratio of the determined first area of the first pump card and the ideal area of the first pump card. In some examples, the method includes determining whether a tubing of the pump is anchored. In some examples, if the tubing is not anchored, the ideal area of the first pump card is based on a modulus of elasticity of a material of the tubing, a cross-sectional area of the pump and a length of the unanchored tubing.

In some examples, method includes determining a second pump fillage factor for the pump during the second stroke. In such an example, the second amount of liquid produced is further based on the second pump fillage factor.

In some examples, the method includes determining a pressure difference across the pump during the first stroke based on the first pump fillage factor. In such an example, the leakage proportionality constant is determined further based on the pressure difference across the pump.

In some examples, the first amount of liquid produced is measured using a separator. In some examples, the method includes computing a third pump card based on a third stroke of the pump, determining a third area of the third pump card, determining a third amount of liquid produced by the pump during the third stroke based on the leakage proportionality constant and the third area and summing the second amount and third amount to determine a net fluid produced by the pump during the second and third strokes.

Another example apparatus disclosed herein includes a housing to be used with a pumping unit having a downhole pump and a processor disposed in the housing. The processor of the example apparatus is to determine a first area of a first pump card based on a first stroke of the pump, determine a leakage proportionality constant of the pump based on a first amount of liquid produced by the pump during the first stroke and the first area, determine a second area of a second pump card based on a second stroke of the pump and determine a second amount of liquid produced by the pump during the second stroke based on the leakage proportionality constant and the second area.

In some examples, the apparatus includes a separator. The separator is to measure the first amount of liquid produced by the pump during the first stroke. In some examples, the processor is to determine a first pump fillage factor for the pump during for the first stroke. In such an example, the leakage proportionality constant is further based on the first pump fillage factor. In some such examples, the processor is to determine a second pump fillage factor for the pump during the second stroke. In such an example, the second amount of fluid produced is further based on the second pump fillage factor. In some such examples, the processor is to determine an intake pressure of the pump during the second stroke based on the second pump fillage factor. In some examples, the apparatus includes a motor to drive the pump. In such an example, the processor is to control a speed of the motor based on the intake pressure of the pump.

Disclosed herein is an example tangible machine readable storage device having instructions that, when executed, cause a machine to at least compute a first pump card based on a first stroke of a downhole pump, determine a first area of the first pump card and determine a leakage proportionality constant of the pump based on a first amount of liquid produced by the pump during the first stroke and the first area. The instructions are also to cause the machine to compute a second pump card based on a second stroke of the pump and determine a second amount of fluid produced by the pump during the second stroke based on the leakage proportionality constant and the second area.

In some examples, the instructions, when executed, further cause the machine to determine a first pump fillage factor for the pump during the first stroke. In such an example, the leakage proportionality constant is further based on the first pump fillage factor. In some examples, the instructions, when executed, further cause the machine to determine a second pump fillage factor for the pump during the second stroke. In such an example, the second amount of liquid produced is further based on the second pump fillage factor. In some examples, the instructions, when executed, further cause the machine to determine an ideal area of the second pump card. In such an example, the second pump fillage factor is based on a ratio of the determined second area of the second pump card and the ideal area of the second pump card. In some such examples, the instructions, when executed, further cause the machine to determine a pressure difference across the pump during the second stroke based on the second pump fillage factor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
measuring a first amount of liquid produced from a well by a pump during a first stroke of the pump;
computing, by executing an instruction with a processor, a first pump card based on the first stroke, the first pump card including a first plot of load relative to position of the pump during the first stroke;
determining, by executing an instruction with the processor, a first area of the first plot of the first pump card;
determining, by executing an instruction with the processor, a first pump fillage factor for the pump for the first stroke;
determining, by executing an instruction with the processor, a leakage proportionality constant of the pump based on the first amount of liquid produced, the first area, and the first pump fillage factor;
computing, by executing an instruction with the processor, a second pump card based on a second stroke of the pump, the second pump card including a second plot of load relative to position of the pump during the second stroke;
determining, by executing an instruction with the processor, a second area of the second plot of the second pump card;
determining, by executing an instruction with the processor, a second pump fillage factor for the pump for the second stroke;
determining, by executing an instruction with the processor, a second amount of liquid produced by the pump during the second stroke based on the leakage proportionality constant the second area, and the second pump fillage factor;
determining, by executing an instruction with the processor, an intake pressure of the pump during the second stroke based on the second pump fillage factor; and
controlling, by executing an instruction with the processor, the pump based on the intake pressure.

2. The method of claim 1 further including determining an ideal area of the first pump card, wherein the first pump fillage factor is based on a ratio of the determined first area of the first pump card and the ideal area of the first pump card.

3. The method of claim 2 further including determining whether a tubing of the pump is anchored.

4. The method of claim 3, wherein if the tubing is not anchored, the ideal area of the first pump card is based on a modulus of elasticity of a material of the tubing, a cross-sectional area of the pump and a length of the unanchored tubing.

5. The method of claim 1 further including determining a pressure difference across the pump during the first stroke based on the first pump fillage factor, wherein the leakage proportionality constant is determined further based on the pressure difference across the pump.

6. The method of claim 1, wherein the first amount of liquid produced is measured using a separator.

7. The method of claim 1 further including:
computing a third pump card based on a third stroke of the pump;
determining a third area of the third pump card;
determining a third amount of liquid produced by the pump during the third stroke based on the leakage proportionality constant and the third area; and
summing the second amount and third amount to determine a net fluid produced by the pump during the second and third strokes.

8. The method of claim 1, wherein controlling the pump based on the intake pressure includes increasing a speed of the pump if the intake pressure satisfies a threshold pressure and decreasing a speed of the pump if the intake pressure does not satisfy the threshold pressure.

9. The method of claim 1, wherein controlling the pump based on the intake pressure includes stopping the pump if the intake pressure does not satisfy a threshold pressure for a predetermined number of strokes.

10. An apparatus comprising:
a housing to be used with a pumping unit having a downhole pump; and
a processor disposed in the housing, the processor to:
determine a first area of a first plot of a first pump card based on a first stroke of the pump, the first plot being load relative to position of the pump during the first stroke;
determine a first pump fillage factor for the pump for the first stroke;
determine a leakage proportionality constant of the pump based on a first amount of liquid produced by the pump during the first stroke, the first area, and the first pump fillage factor;
determine a second area of a second plot of a second pump card based on a second stroke of the pump, the second plot being load relative to position of the pump during the second stroke;

determine a second pump fillage factor for the pump for the second stroke;

determine a second amount of liquid produced by the pump during the second stroke based on the leakage proportionality constant the second area, and the second pump fillage factor;

determine an intake pressure of the pump during the second stroke based on the second pump fillage factor; and control the pump based on the intake pressure.

11. The apparatus of claim 10 further including a separator, the separator to measure the first amount of liquid produced by the pump during the first stroke.

12. The apparatus of claim 10 further including a motor to drive the pump, the processor to control the pump by controlling a speed of the motor based on the intake pressure of the pump.

13. The apparatus of claim 12, wherein the processor is to control the speed of the motor by increasing the speed of the motor if the intake pressure satisfies a threshold pressure and decreasing a speed of the motor if the intake pressure does not satisfy the threshold pressure.

14. The apparatus of claim 10, wherein the processor is to control the pump by stopping the pump if the intake pressure does not satisfy a threshold pressure for a predetermined number of strokes.

15. A non-transitory machine readable storage device comprising instructions that, when executed, cause a machine to at least:

compute a first pump card based on a first stroke of a downhole pump, the first pump card including a first plot of load relative to position of the pump during the first stroke;

determine a first area of the first plot of the first pump card;

determine a first pump fillage factor for the pump for the first stroke;

determine a leakage proportionality constant of the pump based on a first amount of liquid produced by the pump during the first stroke, the first area, and the first pump fillage factor;

compute a second pump card based on a second stroke of the pump, the second pump card including a second plot of load relative to position of the pump during the second stroke;

determine a second area of the second plot of the second pump card;

determine a second pump fillage factor for the pump for the second stroke;

determine a second amount of fluid produced by the pump during the second stroke based on the leakage proportionality constant the second area, and the second pump fillage factor;

determine an intake pressure of the pump during the second stroke based on the second pump fillage factor; and control the pump based on the intake pressure.

16. The non-transitory machine readable storage device of claim 15 wherein the instructions, when executed, further cause the machine to determine an ideal area of the second pump card, wherein the second pump fillage factor is based on a ratio of the determined second area of the second pump card and the ideal area of the second pump card.

17. The non-transitory machine readable storage device of claim 15 wherein the instructions, when executed, further cause the machine to determine a pressure difference across the pump during the second stroke based on the second pump fillage factor.

18. The non-transitory machine readable storage device of claim 15, wherein the instructions, when executed, cause the machine to increase a speed of the pump when the intake pressure satisfies a threshold pressure and decrease a speed of the pump if the intake pressure does not satisfy the threshold pressure.

19. The non-transitory machine readable storage device of claim 15, wherein the instructions, when executed, cause the machine to stop the pump when the intake pressure does not satisfy a threshold pressure for a predetermined number of strokes.

* * * * *